US010102871B1

(12) United States Patent
Basu et al.

(10) Patent No.: US 10,102,871 B1
(45) Date of Patent: Oct. 16, 2018

(54) HIGH DAMPING MATERIALS IN SHIELDS AND/OR WRITE POLE

(71) Applicant: Seagate Technology LLC, Cupertino, CA (US)

(72) Inventors: Swaraj Basu, Londonderry (GB); Vijayharan A. Venugopal, Londonderry (GB); Cillian O'Brian Fallon, Co. Donegal (IE); Martin Liam McGarry, Northern Ireland (GB)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/659,840

(22) Filed: Jul. 26, 2017

(51) Int. Cl.
| | |
|---|---|
| *G11B 5/187* | (2006.01) |
| *G11B 5/235* | (2006.01) |
| *G11B 5/31* | (2006.01) |
| *G11B 5/11* | (2006.01) |
| *G11B 5/127* | (2006.01) |

(52) U.S. Cl.
CPC .............. *G11B 5/1871* (2013.01); *G11B 5/11* (2013.01); *G11B 5/1278* (2013.01); *G11B 5/1877* (2013.01); *G11B 5/235* (2013.01); *G11B 5/312* (2013.01); *G11B 5/315* (2013.01); *G11B 5/3116* (2013.01); *G11B 5/3146* (2013.01)

(58) Field of Classification Search
CPC ... G11B 5/1278; G11B 5/1877; G11B 5/3166; G11B 5/3146; G11B 5/315
USPC ............ 360/125.08, 125.12, 119.02, 119.03, 360/125.03, 125.3
See application file for complete search history.

(56) References Cited

U.S. PATENT DOCUMENTS

| | | | | |
|---|---|---|---|---|
| 7,595,959 | B2 * | 9/2009 | Covington | G11B 5/1278 360/125.02 |
| 8,724,259 | B1 * | 5/2014 | Liu | G11B 5/1278 360/125.15 |
| 9,135,930 | B1 * | 9/2015 | Zeng | G11B 5/1278 |
| 9,466,319 | B1 * | 10/2016 | Tang | G11B 5/1278 |
| 9,508,364 | B1 * | 11/2016 | Tang | G11B 5/112 |
| 9,626,990 | B2 * | 4/2017 | Tang | G11B 5/112 |
| 2008/0088983 | A1 | 4/2008 | Meyer et al. | |
| 2010/0149697 | A1 * | 6/2010 | Nunokawa | G11B 5/3116 360/319 |
| 2010/0246054 | A1 | 9/2010 | Shiroishi | |
| 2012/0268844 | A1 | 10/2012 | Yamada et al. | |
| 2013/0027809 | A1 * | 1/2013 | Min | C25D 5/022 360/122 |
| 2013/0271866 | A1 | 10/2013 | Sato | |
| 2014/0037861 | A1 * | 2/2014 | Min | G11B 5/1278 427/548 |
| 2014/0063648 | A1 * | 3/2014 | Shiroishi | G11B 5/3909 360/75 |
| 2014/0085753 | A1 * | 3/2014 | Nagasaka | G11B 5/314 360/234.3 |

(Continued)

*Primary Examiner* — Jefferson Evans
(74) *Attorney, Agent, or Firm* — Westman, Champlin & Koehler, P.A.

(57) ABSTRACT

A write head for recording data on a storage medium. The write head includes a bearing surface and a write pole. The write pole includes a main pole layer having a front surface that forms a portion of the bearing surface. The front surface of the write pole has a leading edge and a trailing edge. The write pole further includes a high damping material layer. The high damping material layer has a front end that is attached to the main pole layer at the leading edge.

18 Claims, 11 Drawing Sheets

(56) References Cited

U.S. PATENT DOCUMENTS

| | | | |
|---|---|---|---|
| 2014/0177104 A1* | 6/2014 | Ukita | G11B 5/1278 360/236.5 |
| 2016/0148627 A1* | 5/2016 | Nagasaka | G11B 5/35 360/123.05 |
| 2016/0180868 A1* | 6/2016 | Gubbins | G11B 5/3116 360/125.12 |
| 2018/0144768 A1* | 5/2018 | Liu | G11B 5/187 |

* cited by examiner

HIGH DAMPING MATERIALS IN SHIELDS AND/OR WRITE POLE

BACKGROUND

Data storage devices use magnetic recording heads to read and/or write data on magnetic storage media, such as data storage discs. Magnetic recording heads typically include inductive write elements to record data on the storage media. An inductive write element or transducer may include a main pole having a pole tip and one or more return poles. Current is supplied to write coils to induce a flux path in the main pole to record data on one or more magnetic storage layers of the media.

With ever-increasing levels of recording density in disc drives, the write element needs to have correspondingly better data-recording capabilities and needs to be substantially reliable.

SUMMARY

Various embodiments of the disclosure generally relate to including high damping materials in shields and/or write poles of write heads to improve reliability of the write heads.

In one embodiment, a write head is provided. The write head includes a bearing surface and a write pole. The write pole includes a main pole layer having a front surface that forms a portion of the bearing surface. The front surface of the write pole has a leading edge and a trailing edge. The write pole further includes a high damping material layer. The high damping material layer has a front end that is attached to the main pole layer at the leading edge.

Other features and benefits that characterize embodiments of the disclosure will be apparent upon reading the following detailed description and review of the associated drawings.

DETAILED DESCRIPTION OF ILLUSTRATIVE EMBODIMENTS

Embodiments of the disclosure generally relate to including high damping materials in shields and/or write poles of write heads to improve reliability of the write heads. However, prior to providing additional details regarding the different embodiments, a description of an illustrative operating environment is provided below.

Figure 1A:
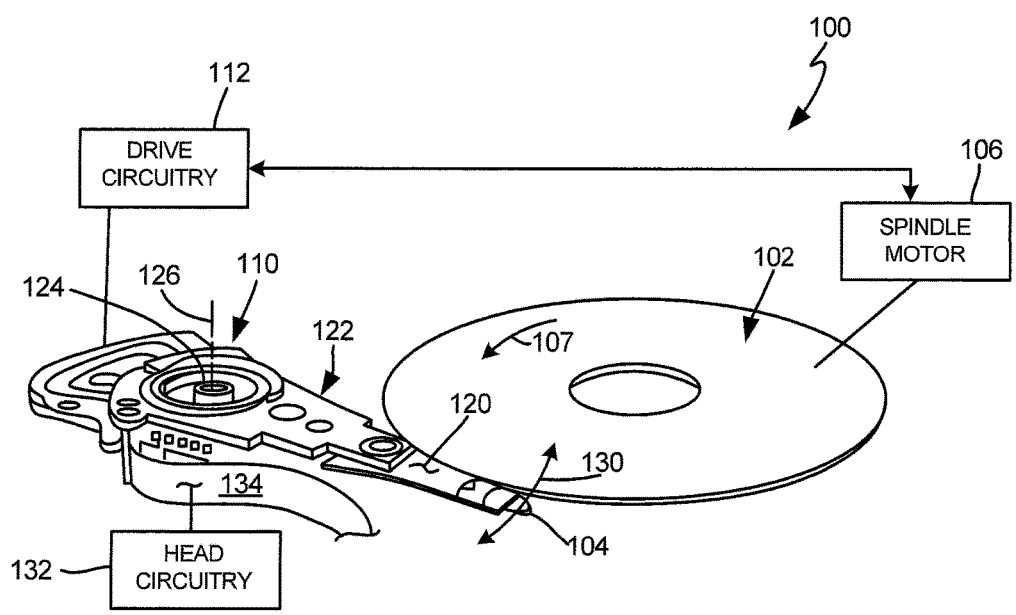
FIG. 1A illustrates an embodiment of a data storage device in which embodiments of the present application can be used.

FIG. 1A shows an illustrative operating environment in which certain write head embodiments disclosed herein may be incorporated. The operating environment shown in FIG. 1A is for illustration purposes only. Embodiments of the present disclosure are not limited to any particular operating environment such as the operating environment shown in FIG. 1A. Embodiments of the present disclosure are illustratively practiced within any number of different types of operating environments.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1A is a schematic illustration of a data storage device 100 including a data storage medium and a head for reading data from and/or writing data to the data storage medium. As shown in FIG. 1A, the data storage device 100 includes a data storage medium 102 and a head 104. The head 104 including one or more transducer elements (not shown in FIG. 1A) is positioned above the data storage medium 102 to read data from and/or write data to the data storage medium 102. In the embodiment shown, the data storage medium 102 is a rotatable disc or other magnetic storage medium that includes a magnetic storage layer or layers. For read and write operations, a spindle motor 106 (illustrated schematically) rotates the medium 102 as illustrated by arrow 107 and an actuator mechanism 110 positions the head 104 relative to data tracks on the rotating medium 102. Both the spindle motor 106 and actuator mechanism 110 are connected to and operated through drive circuitry 112 (schematically shown). The head 104 is coupled to the actuator mechanism 110 through a suspension assembly which includes a load beam 120 connected to an actuator arm 122 of the mechanism 110 for example through a swage connection.

The one or more transducer elements of the head 104 are coupled to head circuitry 132 through flex circuit 134 to encode and/or decode data. Although FIG. 1A illustrates a single load beam 120 coupled to the actuator mechanism 110, additional load beams 120 and heads 104 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 104 in a cross track direction as illustrated by arrow 130.

Figure 1B:
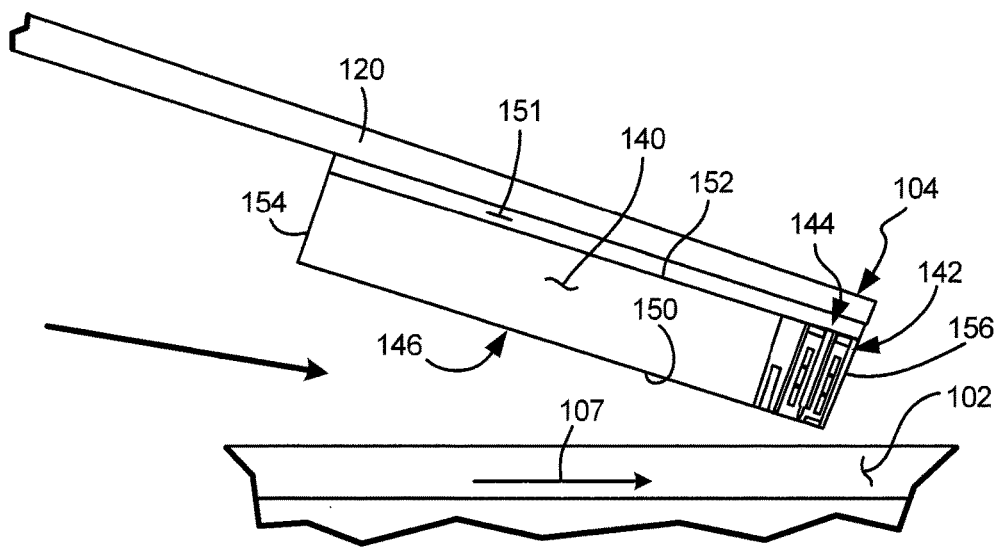
FIG. 1B is a schematic illustration of a head including one or more transducer elements above a magnetic recording medium.

FIG. 1B is a detailed illustration (side view) of the head 104 above the medium 102. The one or more transducer elements on the head 104 are fabricated on a slider 140 to form a transducer portion 142 of the head 104. The transducer portion 142 shown includes write elements encapsulated in an insulating structure to form a write assembly 144 of the head. As shown, the head 104 includes a bearing surface (for example, and air bearing surface (ABS)) 146 along a bottom surface 150 of the head or slider facing the medium 102. The head 104 is coupled to the load beam 120 through a gimbal spring 151 coupled to a top surface 152 of the head or slider 140 facing away from the medium 102. The medium 102 can be a continuous storage medium, a discrete track medium, a bit patterned medium or other magnetic storage medium including one or more magnetic recording layers.

During operation, rotation of the medium or disc 102 creates an air flow in direction 107 as shown in FIG. 1B along the air bearing surface 146 of the slider 140 from a leading edge 154 to the trailing edge 156 of the slider 140 or head 104. Air flow along the air bearing surface 146 creates a pressure profile to support the head 104 and slider 140 above the medium 102 for read and/or write operations. As shown, the transducer portion 142 is formed at or near the trailing edge 156 of the slider 140.

The ever-increasing levels of recording density in data storage devices such as disc drives has caused a push for better write performance which, in turn, has resulted in certain write head designs the may have reliability problems. In some write head designs, write pole shapes and upper and lower bevels included in the write poles may dump a substantial quantity of flux to the write pole shields.

As will be described below, to address such problems, embodiments of the disclosure employ a high damping material in shields and/or a pole of a write head. Results discussed further below indicate that the inclusion of such a high damping material in the shields and/or the pole provide reliability and performance benefits to the write head. A write head in accordance with one embodiment is described below in connection with FIGS. 2A-2C.

Figure 2A:
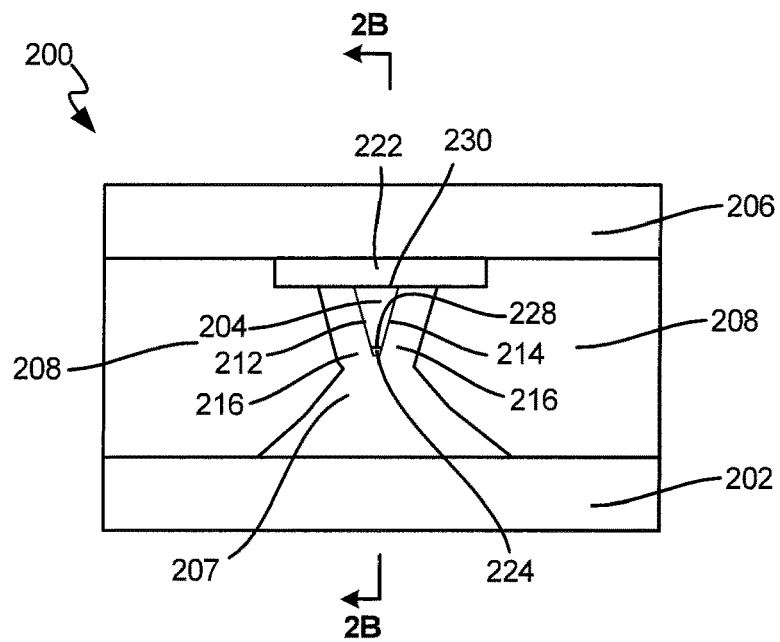
FIG. 2A depicts a bearing surface view of a perpendicular magnetic recording (PMR) transducer in accordance with one embodiment.
Figure 2B:
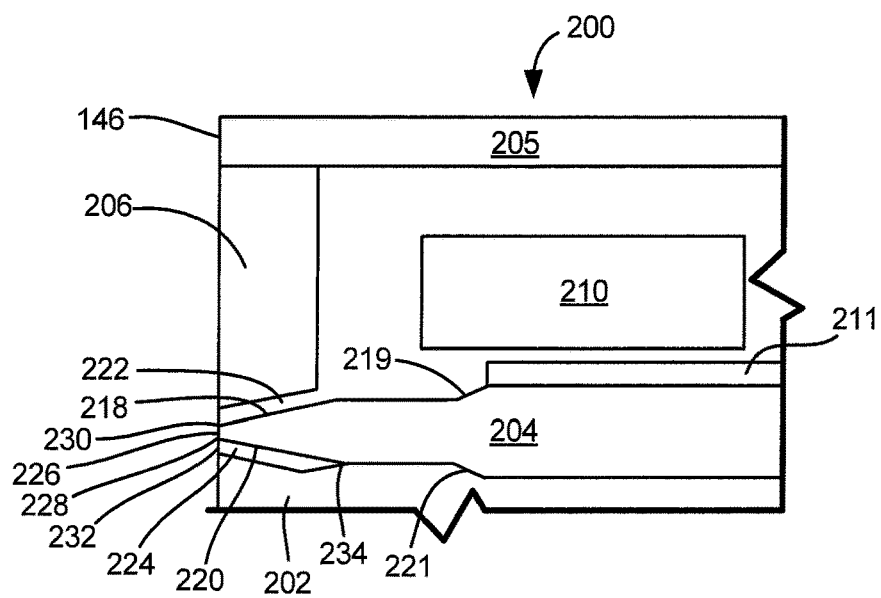
FIG. 2B depicts a side view of the PMR transducer of FIG. 2A.
Figure 2C:
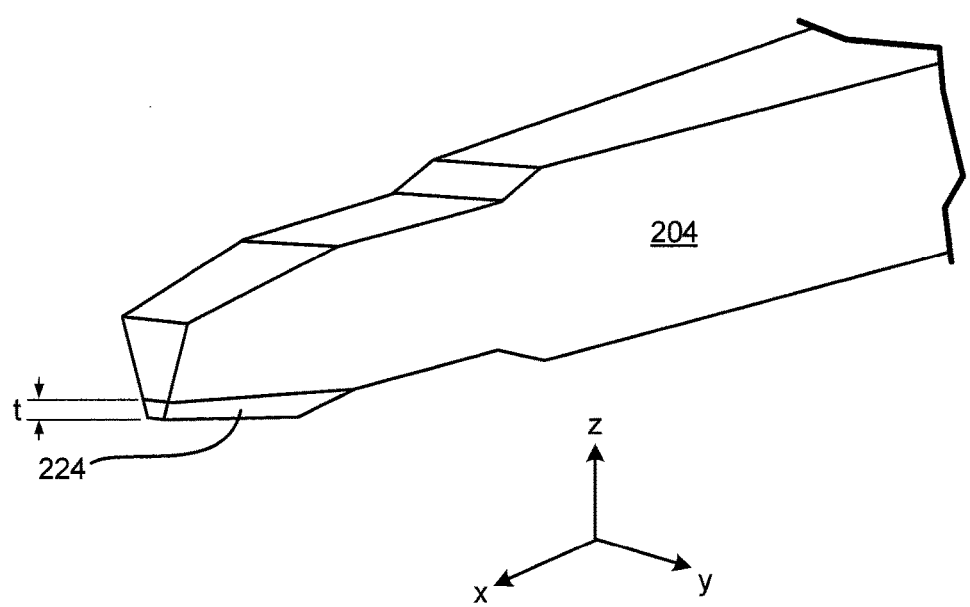
FIG. 2C depicts a perspective view of a portion of the PMR transducer of FIGS. 2A and 2B.

FIGS. 2A, 2B and 2C depict air bearing surface, side and perspective views, respectively, of a perpendicular magnetic recording (PMR) transducer or head 200 in accordance with one embodiment. The PMR transducer 200 may be a part of a merged head including the write transducer 200 and a read transducer (not shown). Alternatively, the magnetic recording head may be a write head only including the write transducer 200. The PMR transducer elements shown in FIGS. 2A, 2B and 2C are illustratively included in a recording head such as recording head 104 of FIGS. 1A and 1B.

The write transducer 200 includes an under-layer/substrate 202, a main pole 204, at least one return pole 205, a trailing edge shield 206 and side shields 208. The under-layer 202 may include multiple structures which are under the pole 204. The write transducer 200 may also include other components including but not limited to coils (denoted by reference numeral 210 in FIG. 2B) for energizing the main pole 204, and a yoke 211.

The main pole 204 resides over under-layer 202 and includes sidewalls 212 and 214. Sidewalls 212 and 214 are separated from the side shields 208 by non-magnetic side shield gaps (SSGs) 216. The top (trailing) surface of the main pole 204 also has a beveled portion 218. The bottom (leading) surface of the main pole 204 may further include a leading surface bevel 220. Additional beveled portions 219 and 221 may also be present behind the bearing surface 146. A trailing shield gap (TSG) 222 is formed between the main pole 204 and the trailing edge shield 206.

In accordance with one embodiment, the write head 200 further includes a high damping material layer 224 attached to the leading surface bevel 220. Further, in some embodiments, side shields 208 may include a high damping material. In an alternate embodiment, the high damping material layer 224 may be attached to the leading surface bevel 220 and no high damping material may be included in side shields 208. In still another embodiment, the high damping material may be included in the side shields 208 and no high damping material layer 224 may be attached to the leading surface bevel 220. In some embodiments, the high damping material layer 224 includes a magnetic material (e.g. Fe, FeCo, Permalloy) infused with a small percentage of a transition 4d or 5d metal such as renium, osmium, iridium, etc. For example, the high damping material layer may be FeCoX, with X being the transition 4d or 5d metal having a content between about 1 and about 15 atomic %. In some embodiments, a thickness (t in FIG. 2C) of high damping material layer 224 may be between about 10 nanometers (nm) and about 50 nm. In other embodiments, a thickness of high damping material layer 224 may be more than 50 nm. Shields 208 may similarly include a magnetic material infused with a small percentage of a transition 4d or 5d metal such as renium, osmium, iridium, etc. Such writer shields respond to flux leakage from the write pole 204 in a gentler manner, thereby improving the erasure fields by cutting-out peaks. In some embodiments, shields 208 may be laminated structures with at least one layer of the laminated structure including a small percentage of a transition 4d or 5d metal such as renium, osmium, iridium, etc., and at least one other layer not including any transition 4d or 5d metal.

As can be seen in FIGS. 2A and 2B, at the bearing surface 146, the main pole 204 has a trapezoid shape with a front surface 226 that forms a portion of the bearing surface 146. The front surface 226 has a leading edge 228 and a trailing edge 230. In one embodiment, the high damping material layer 224 has a front end 232 that is attached to the main pole 204 at the leading edge 228. As can be seen in FIG. 2B, the high damping material layer 224 extends from the front end at the leading edge 228 to a rear end 234 of the leading surface bevel 220. It should be noted that, in different embodiments, the high damping material may or may not cover the entire leading surface bevel 220.

In the embodiment described above in connection with FIGS. 2A and 2B, side shields 208 are split (e.g., side shields 208 are not connected below the leading edge or bottom edge 228 of the main pole 204). As can be seen in FIGS. 2A and 2B, the side shields are split by layer 207, which may be a non-magnetic or insulating material.

Figure 3A:
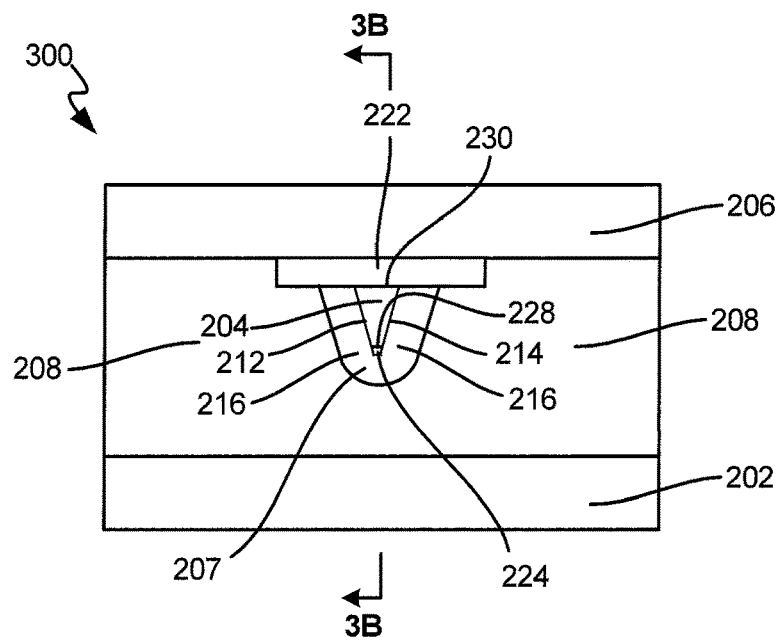
FIG. 3A depicts a bearing surface view of a PMR transducer in accordance with another embodiment.
Figure 3B:
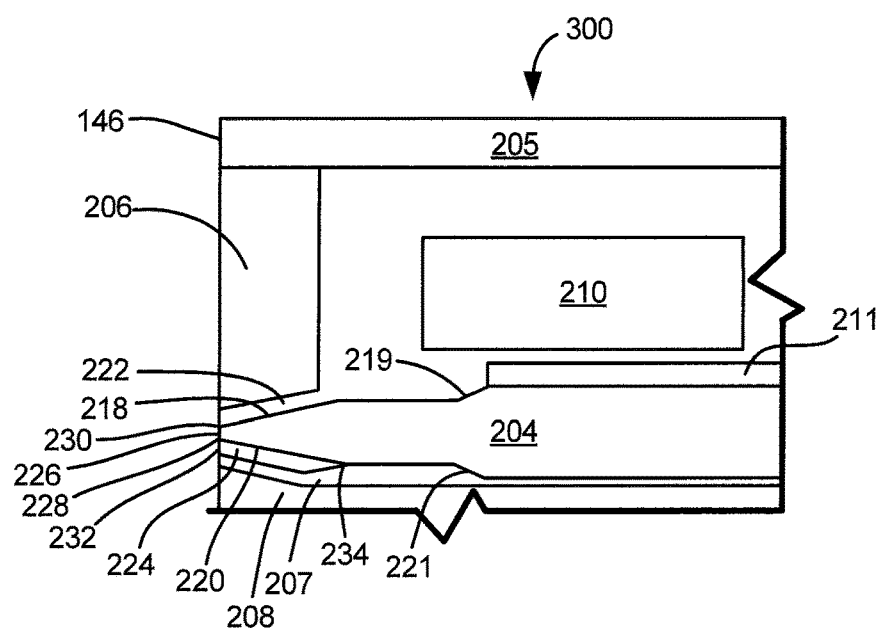
FIG. 3B depicts a side view of the PMR transducer of FIG. 3A.

FIGS. 3A and 3B depict air bearing surface and side views, respectively, of a perpendicular magnetic recording (PMR) transducer or head 300 that has a wrap-around shield configuration in accordance with another embodiment. As can be seen in FIG. 3A, side shields 208 are connected below the leading edge or bottom edge 228 of the main pole 204. As in the case of the write head 200 (of FIGS. 2A and 2B), write head 300 may include a high damping material layer 224 attached to the leading surface bevel 220. Further, in some embodiments, connected side shields 208 of write head 300 may include a high damping material. In an alternate embodiment, the high damping material layer 224 may be attached to the leading surface bevel 220 and no high damping material may be included in connected side shields 208. In still another embodiment, the high damping material may be included in the connected side shields 208 and no high damping material layer 224 may be attached to the leading surface bevel 220.

As in the case of the write head 200 (of FIGS. 2A and 2B), in write head 300, the high damping material layer 224 may extend from the front end at the leading edge 228 to a rear end 234 of the leading surface bevel 220. In different embodiments, the high damping material may or may not cover the entire leading surface bevel 220.

Table 1 and Table 2 included below show modeling results with a normalized 1 Tesla bubble width at a media plane for a split side shield write head design and a wrap-around shield write head design, respectively. Each of Tables 1 and 2 compares results of a baseline write head design (e.g., a write head without a high damping material layer attached to the write pole) with a write head design including a high damping material layer attached to the write pole. A damping parameter used is the models for the write head including the high damping material layer is five times that of a nominal damping value (e.g., a damping value used for a write pole model without a high damping material layer). In Tables 1 and 2 below, different parameters are shown in percentage (%) over the performance of the respective write heads of a baseline design.

TABLE 1

| Design | Maximum effective field [%] | Down-track gradient [%] | Field angle [%] |
| --- | --- | --- | --- |
| Split side shield baseline | 0 | 0 | 0 |
| Split side shield with high damping layer | 0.13 | 0.68 | 0.39 |

TABLE 2

| Design | Maximum effective field [%] | Down-track gradient [%] | Field angle [%] |
| --- | --- | --- | --- |
| Wrap-around side shield baseline | 0 | 0 | 0 |
| Wrap-around side shield with high damping layer | −0.26 | 1.55 | 2.07 |

Form Table 1 and Table 2, it is seen that that there is a gain in down-track gradient, and the gain is higher for a wrap-around design.

Figure 4:
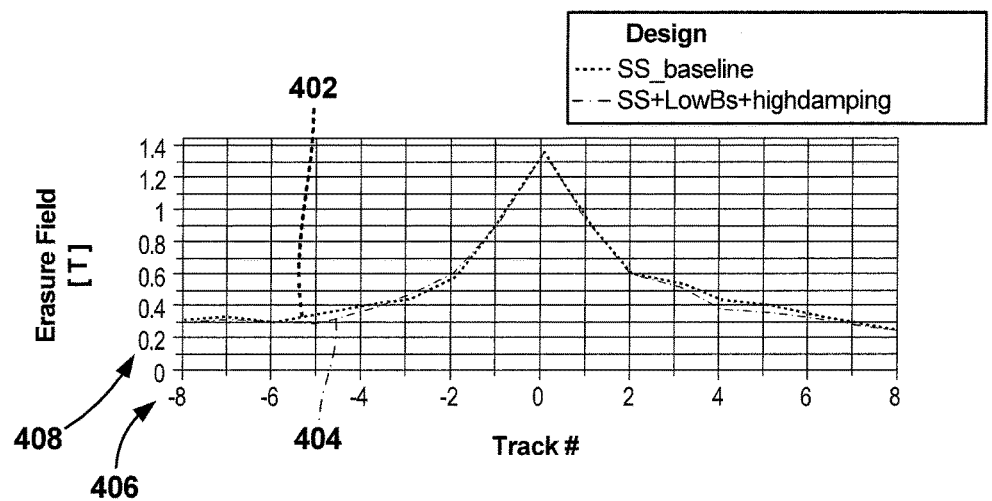
FIGS. 4 and 5 are graphs that include plots of results obtained from write heads with and without a high damping material layer attached to a main pole layer.

FIG. 4 is a graph 400 that includes plots of results obtained from write heads with and without a high damping material layer attached to the main pole layer. Plot 402 is for a baseline write head (e.g., a write head that does not include the high damping material layer attached to the main pole layer). Plot 404 is for a split side shield write head (e.g., 200) that includes the high damping material layer attached to the main pole layer. In FIG. 4, horizontal axis 406 represents track number and vertical axis 408 represents erasure fields in Tesla (T). Track 0 is the track on which the write operations with the write heads take place, and the track numbers on either side of track 0 denote tracks on either side of track 0. A comparison of plots 402 and 404 shows that the erasure fields from the write head design with the high damping material layer attached to the main pole layer are less compared to the baseline design.

Figure 5:
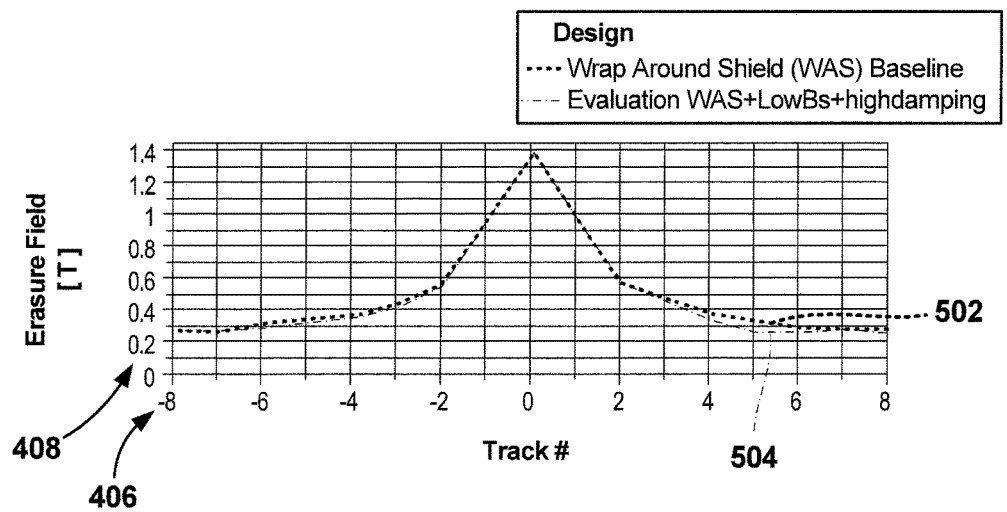

FIG. 5 is a graph 500 that includes plots of results obtained from write heads with and without a high damping material layer attached to the main pole layer. Plot 502 is for a baseline write head (e.g., a write head that does not include the high damping material layer attached to the main pole layer). Plot 504 is for a wrap-around side shield write head (e.g., 300) that includes the high damping material layer attached to the main pole layer. In FIG. 5, horizontal axis 406 represents track number and vertical axis 408 represents erasure fields in Tesla (T). Track 0 is the track on which the write operations with the write heads take place, and the track numbers on either side of track 0 denote tracks on either side of track 0. A comparison of plots 502 and 504 shows that the erasure fields from the write head design with the high damping material layer attached to the main pole layer are less compared to the baseline design.

Figure 6A:
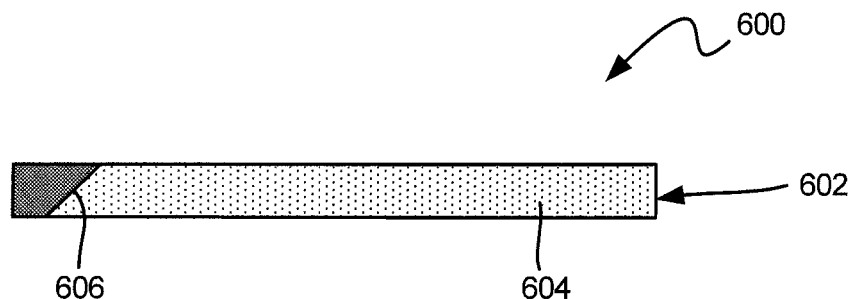
FIGS. 6A-6F illustrate process steps for fabricating a PMR transducer of the type shown in FIGS. 2A and 2B.

FIGS. 6A-6F illustrate block diagrams of partial write transducer structures during manufacturing of a write transducer such as 200 in accordance with one embodiment. FIG. 6A illustrates a side view of a partial write transducer structure or substrate 600. The substrate 602 includes an insulation layer (e.g., alumina ($Al_2O_3$)) 604 and a portion of a main pole layer having a rear bottom bevel 606 (equivalent to bevel 221 of FIG. 2B). In the interest of simplification, details regarding formation of the main pole layer portion having the rear bottom bevel 606 are not included. It should be noted that other structures or devices in a head may be below the substrate 602.

Figure 6B:
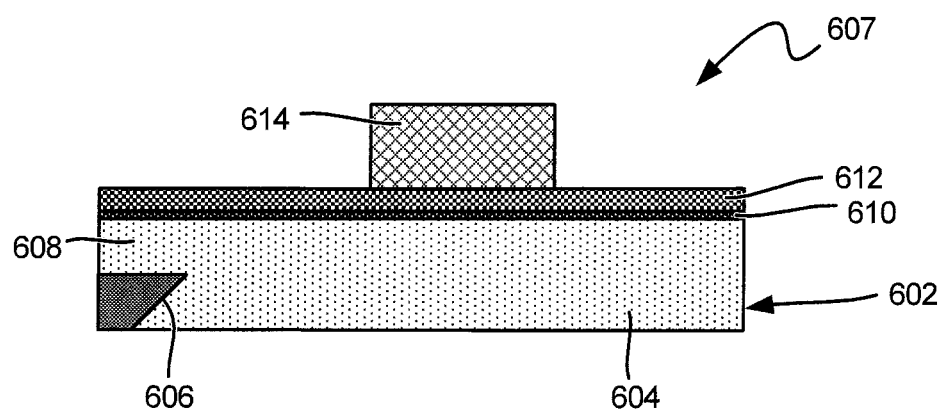

FIG. 6B is a side view of a second structure 607 formed during manufacture of the write transducer such as 200. Formation of structure 607 includes depositing an insulation layer (e.g., alumina) 608 over substrate 602. Layer 608 is of a thickness that is suitable for forming a bumper bevel, which is denoted by reference numeral 615 in FIG. 6E that is described further below. A thin non-magnetic layer 610 is deposited on insulation layer 608. The thin non-magnetic layer 610 may be of a different material than the material of insulation layer 604, 608. A sacrificial hard mask layer 612 is deposited on the non-magnetic layer 610, and a photoresist 614 is coated on the hard mask layer 612 and patterned.

Figure 6C:
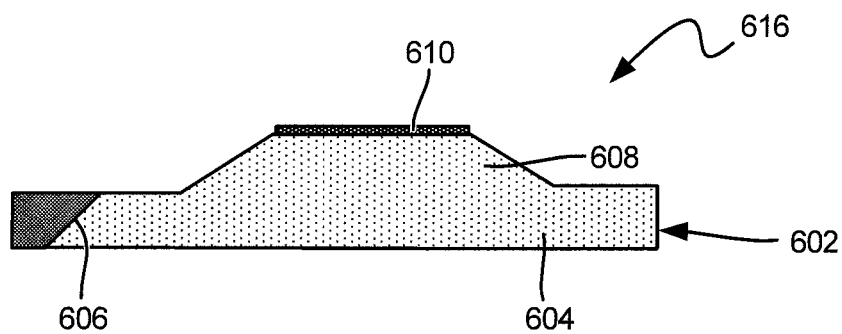

FIG. 6C illustrates a side view of another partial write transducer structure 616. Structure 616 is generated as a result of first performing a milling operation on structure 607, and then stripping photoresist 614 and clearing a remaining portion of sacrificial hard mask layer 612. As can be seen in FIG. 6C, a portion of thin non-magnetic layer 610 under photoresist mask 614 remains and protects a top portion of layer 608 during a subsequent material-removal process.

Figure 6D:
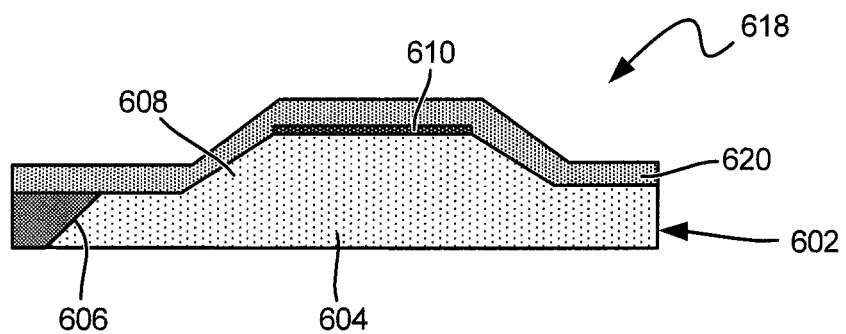

FIG. 6D illustrates a side view of yet another partial write transducer structure 618. Structure 618 is formed by depositing a high damping material layer 620 on structure 616 of FIG. 6C. As noted above, the high damping material layer 620 may include a magnetic material (e.g. Fe, FeCo, Permalloy) infused with a small percentage of a transition 4d or 5d metal such as renium, osmium, iridium, etc.

Figure 6E:
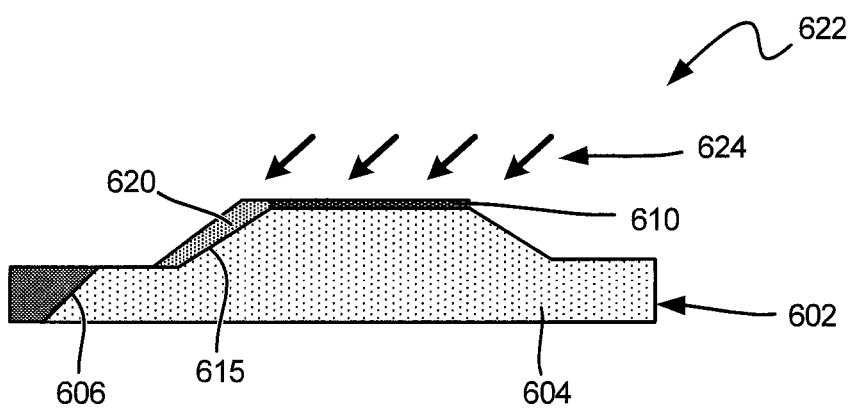

FIG. 6E illustrates a side view of a partial write transducer structure 622 formed after a material removal operation (e.g., milling) is carried out in structure 618 of FIG. 6D. As can be seen in FIG. 6E, a milling operation 624 is conducted at such an angle so that a part of the high damping material layer 620 is protected from the milling operation. For example, the milling operation is conducted at an angle that is lower (as compared to the horizontal surface) compared to the angle of the bumper bevel 615 (again, as compared to the horizontal surface). The milling operation mills away most of the high damping material of layer 620, except for the material that is protected due to the angle of the bumper bevel 615.

Figure 6F:
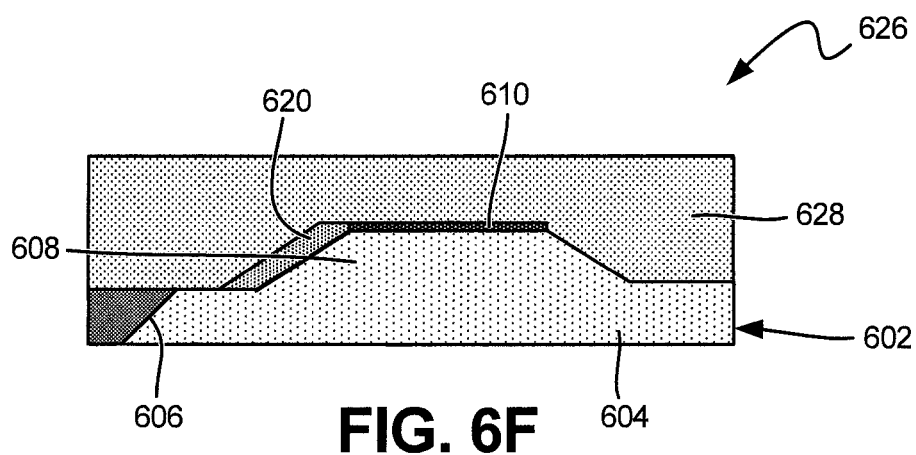
Figure 7A:
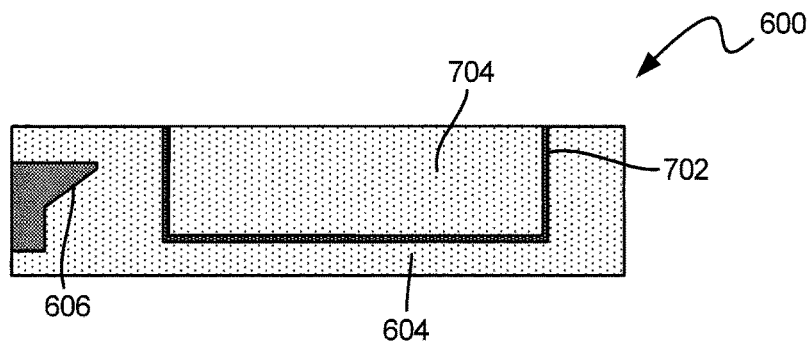
FIGS. 7A-7F illustrate process steps for fabricating a PMR transducer of the type shown in FIGS. 3A and 3B.
Figure 7B:
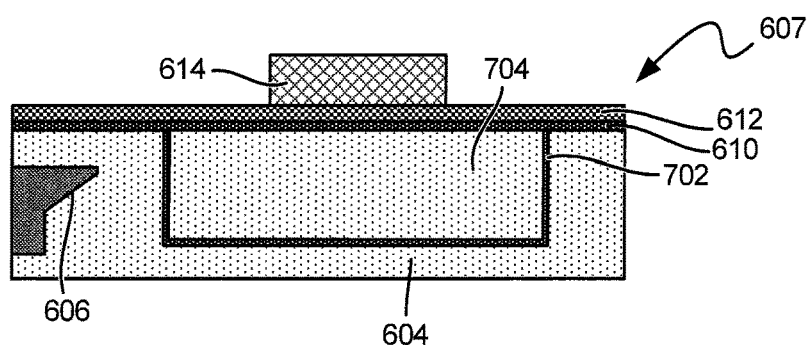
Figure 7C:
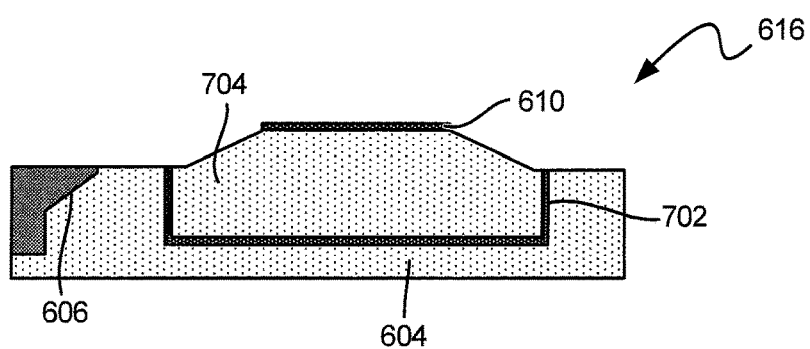
Figure 7D:
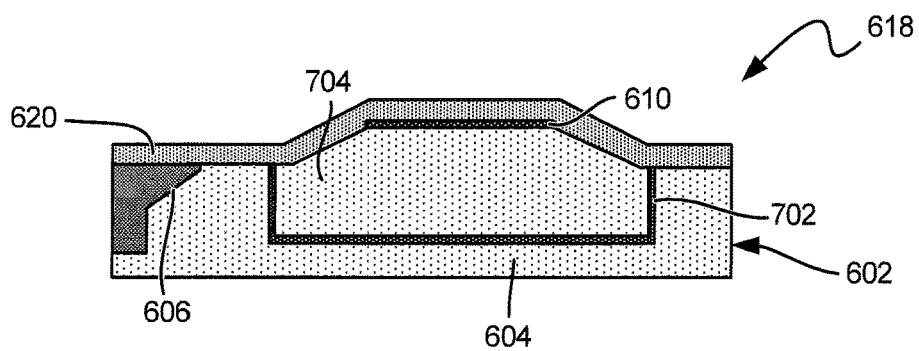
Figure 7E:
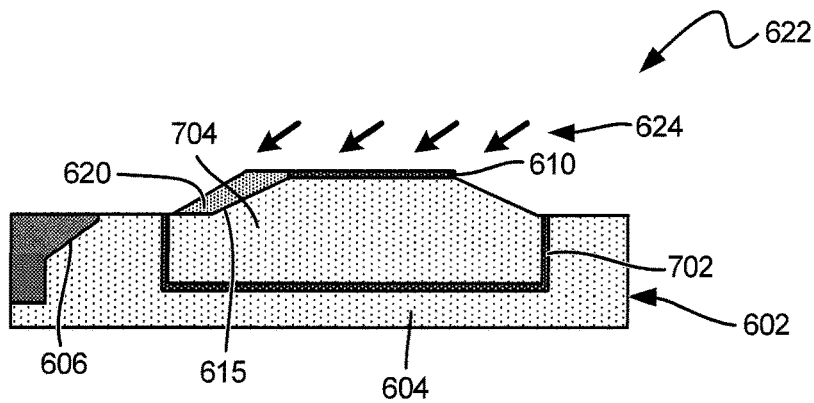
Figure 7F:
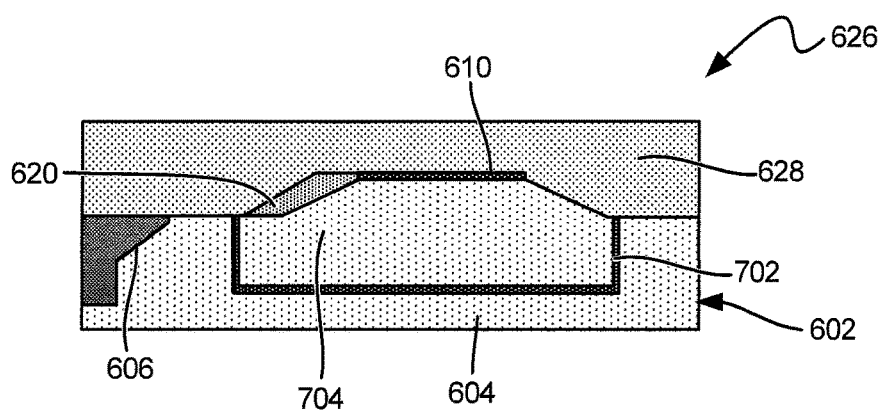

FIG. 6F illustrates a side view of another partial write transducer structure 626. Structure 226 is formed by depositing main write pole layer material 628 on structure 622 of FIG. 6E. Chemical-mechanical planarization or polishing (CMP) may be carried out on the deposited main write pole layer 628 to form a write pole such as 204 of FIGS. 2A, 2B and 2C. In the interest of simplification, steps involving the formation of other write head elements such as shields 208 are not shown and described in connection with FIGS. 6A to 6F. As indicated above, FIGS. 6A-6F are intermediate structures in the formation of a write transducer such as 200, which is a split-shield write head.

FIGS. 7A-7F illustrate block diagrams of partial write transducer structures during manufacturing of a write transducer such as 300 in accordance with one embodiment. As described above in connection with FIGS. 3A and 3B, head 300 that has a wrap-around shield configuration (e.g., side shields 208 are connected below the leading edge or bottom edge 228 of the main pole 204). Accordingly, FIG. 7A-7F include a liner 702, which may be a non-magnetic wet-etch stop layer. The non-magnetic wet-etch stop layer 702 is of a different material than the material of insulation layer 604, 704. It should be noted that a material in region 704 may be the same as the material in region 604, and the different references numerals 604 and 704 are merely used as indicators for the presence of insulation material on different sides of liner 702. The steps carried out to form the high damping material layer in the bumper bevel 615 region are substantially similar to those described above in connection with FIGS. 6A-6F and therefore, in the interest of brevity, a description of the steps is not repeated for FIGS. 7A-7F.

After step 7F is carried out, to form connected side shields 208, material from region 704 is removed by a suitable material-removal process (e.g., a wet-etch process) such that write pole 204 is suspended over a trench or void. Side shield 208 material may then be filled (e.g., plated) into the void to form the wrap-around portion of the side shields 208. Additional steps used to form write head 300 are not described in the interest of simplification.

Figure 8:
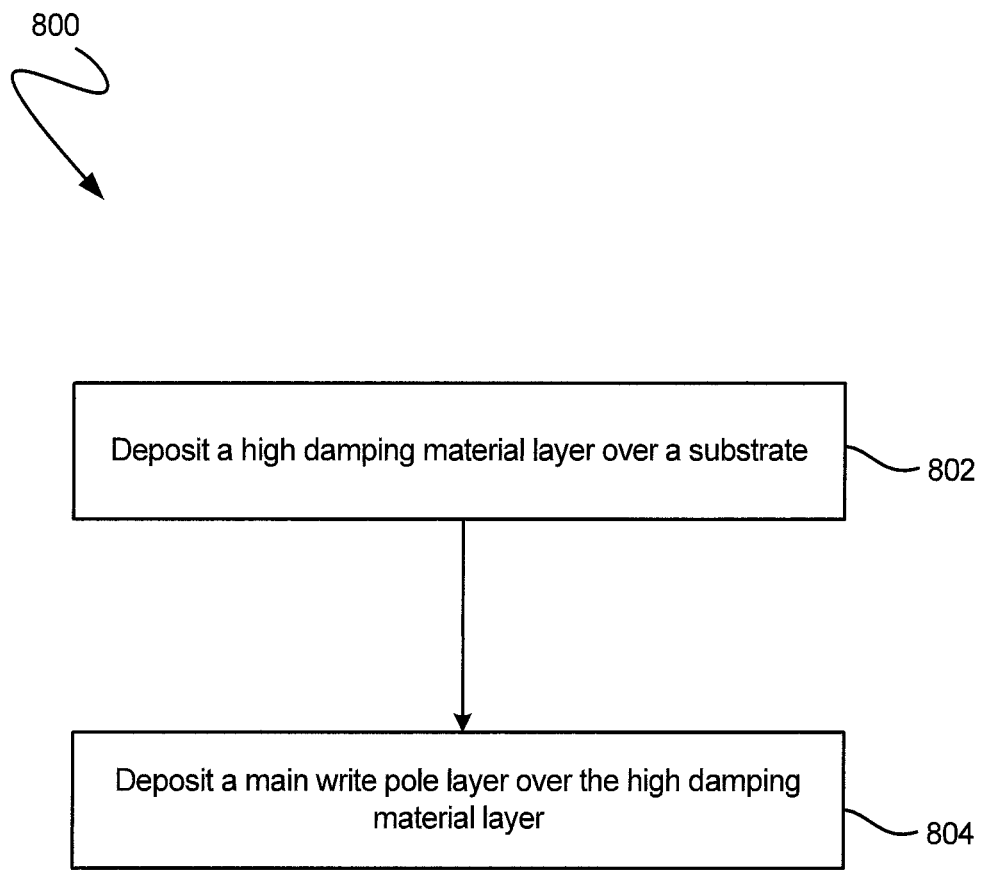
FIG. 8 is a flow diagram of a method embodiment.

FIG. 8 is a simplified flow diagram 800 of a method embodiment. At step 802, a high damping material layer is deposited over a substrate. At step 804, a main write pole layer is deposited over the high damping material layer. The main write pole layer has a bottom surface and a top surface opposite the bottom surface. A portion of the bottom surface of the main write pole layer is in contact with the high damping material layer. In one embodiment, the high damping material layer comprises a magnetic material infused with one of renium, osmium or iridium.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A write head comprising:
  a bearing surface; and
  a write pole comprising:
    a main pole layer having a front surface that forms a portion of the bearing surface, the front surface having a leading edge and a trailing edge; and
    a high damping material layer having a front end attached to, and in direct contact with, the main pole layer at the leading edge, with the front end of the high damping material layer and the leading edge of the front surface of the main pole layer being at the bearing surface.

2. The write head of claim 1 and wherein the main pole layer comprises a beveled portion that extends from the leading edge to a rear edge that is behind the bearing surface, and wherein the high damping material layer is attached to the beveled portion.

3. The write head of claim 2 and wherein the high damping material layer comprises a magnetic material infused with one of renium, osmium or iridium.

4. The write head of claim 1 and further comprising first and second side shields, and wherein the first and second side shields comprise a magnetic material infused with one of renium, osmium or iridium.

5. The write head of claim 1 and further comprising first and second side shields without any damping material.

6. The write head of claim 1 and further comprising first and second side shields, wherein the first side shield is separated from the second side shield below the write pole.

7. The write head of claim 1 and further comprising first and second side shields, wherein the first side shield is connected to the second side shield below the write pole.

8. A method comprising:
   selectively removing material from a substrate to form a bumper bevel;
   depositing a high damping material layer over the substrate with a portion of the high damping material layer over the bumper level; and
   depositing a main write pole layer over the high damping material layer, wherein the main write pole layer comprises a bottom surface and a top surface opposite the bottom surface, and wherein a portion of the bottom surface of the main write pole layer is in contact with the high damping material layer.

9. The method of claim 8 and further comprising, prior to depositing the main write pole layer over the high damping material layer, carrying out a material removal process the remove portions of the high damping material layer that do not cover the bumper bevel, thereby exposing portions of the substrate, and wherein depositing the main write pole layer comprises forming the main write pole layer on the exposed portions of the substrate and on the high damping material layer portion that covers the bumper bevel.

10. The method of claim 9 and wherein the high damping material layer comprises a magnetic material infused with one of renium, osmium or iridium.

11. The method of claim 8 and further comprising forming first and second side shields that are connected together below the bumper bevel.

12. The method of claim 8 and further comprising forming first and second side shields that are separated below the bumper bevel.

13. A write head comprising:
   a bearing surface;
   a write pole comprising:
      a main pole layer having a front surface that forms a portion of the bearing surface, the front surface having a leading edge and a trailing edge; and
      a high damping material layer having a front end attached to, and in direct contact with, the main pole layer at the leading edge, with the front end of the high damping material layer and the leading edge of the front surface of the main vole layer being at the bearing surface; and
   first and second side shields comprising a high damping material.

14. The write head of claim 13 and wherein the main pole layer comprises a beveled portion that extends from the leading edge to a rear edge that is behind the bearing surface, and wherein the high damping material layer is attached to, and in direct contact with, the beveled portion.

15. The write head of claim 13 and wherein the high damping material layer comprises a magnetic material infused with one of renium, osmium or iridium.

16. The write head of claim 13 and wherein the first and second side shields comprise a magnetic material infused with one of renium, osmium or iridium.

17. The write head of claim 13 and wherein the first side shield is separated from the second side shield below the write pole.

18. The write head of claim 13 and wherein the first side shield is connected to the second side shield below the write pole.

* * * * *